United States Patent [19]

Cox

[11] 4,097,571
[45] Jun. 27, 1978

[54] METHOD FOR PRODUCING A FOLDABLE PLASTIC STRIP

[76] Inventor: Bernard K. Cox, R.R. 5, Box 293, Connersville, Ind. 47331

[21] Appl. No.: 735,974

[22] Filed: Oct. 27, 1976

Related U.S. Application Data

[62] Division of Ser. No. 655,518, Feb. 5, 1976.

[51] Int. Cl.² .............................................. B29F 1/00
[52] U.S. Cl. ................................... 264/296; 264/295; 264/328
[58] Field of Search ........................ 264/295, 296, 328

[56] References Cited

U.S. PATENT DOCUMENTS

| | | | |
|---|---|---|---|
| 3,492,387 | 1/1970 | Larson | 264/296 X |
| 3,767,742 | 10/1973 | Robin | 264/328 X |
| 3,773,873 | 11/1973 | Spaak | 264/328 X |
| 3,825,637 | 7/1974 | Robin | 264/328 X |
| 3,953,560 | 4/1976 | Klein | 264/296 X |
| 3,996,329 | 12/1976 | Holland | 264/296 |

*Primary Examiner*—Richard R. Kucia
*Attorney, Agent, or Firm*—Woodard, Weikart, Emhardt & Naughton

[57] ABSTRACT

A mold and method for injection molding a plastic strip having living hinges. The method includes providing a mold as described herein, injecting liquid plastic into the mold to only partially fill the cavity therein, moving the push bar within its channel through a space extending at least one-half the distance across the cavity in the direction of the projecting rib forcing the plastic to flow in the opposite direction and to completely fill the remaining portion of the cavity, and sealing the push bar relative to the channel by means of guide brackets to exclude the flow of plastic behind the push bar during the moving step. The moving step further includes the forming of mutually opposed and aligned grooves in the plastic defining a portion of reduced diameter having opposing and continuous arcuate surfaces, the reduced diameter portion being commonly called a living hinge. The product produced by the mold is in the form of a flat strip having a plurality of living hinges. The panels may be folded into a variety of final configurations with decorative leaves attached to the outwardly-facing exterior surface of the panels. Light may be shown through the panels in those areas not covered by the decorative leaves. One embodiment of the final configured panels is in the form of a light fixture having the configuration of a lamp shade or a box enclosing the lamp.

5 Claims, 12 Drawing Figures

METHOD FOR PRODUCING A FOLDABLE PLASTIC STRIP

This is a division, of application Ser. No. 655,518, filed Feb. 5, 1976.

BACKGROUND OF THE INVENTION

1. Field of the Invention

This invention is in the field of plastics and more specifically, injection moldable plastics.

2. Description of the Prior Art

It is well known to injection mold plastic. Likewise, it is known to connect a plurality of plastic panels together by living hinges which include grooves formed into the plastic providing a reduced thickness allowing the panels to be hinged together. In addition, it is known to hot-stamp various types of foils onto the exterior surface of plastic panels to provide various decorative features. For example, the following U.S. Pat. Nos. disclose the concept of laminating foil to plastic panels; 3,767,500 issued to Tally; 3,410,744 issued to Bold; 3,574,109 issued to Yoshikawa; 3,025,201 issued to Ponemon; and 3,889,363 issued to Davis.

Prior U.S. Pat. Nos. show the concept of forming a living hinge in a plastic panel such as shown in the U.S. Pat. Nos. 3,370,736 issued to Wilentchik, 3,092,529 issued to Pearson, 3,368,692 issued to Voller, and 3,825,459 issued to Taylor.

Living hinges have traditionally been formed in plastic panels produced from polypropylene since polypropylene readily flows when in a liquid state and provides a tough hinge when solidified. Heretofore, plastics of a polycarbonate nature have not been molded with living hinges. The invention herein allows formation of living hinges in a polycarbonate material sold by the General Electric Co. under the trademark "Lexan." Such polycarbonate material is translucent allowing for a variety of different types of products which may be assembled into three-dimensional configurations essentially from two-dimensional strips. Several products are disclosed herein which may be produced from such material.

SUMMARY OF THE INVENTION

One embodiment of the present invention is a method of forming with an injection mold a plastic piece with a living hinge comprising the steps of providing a mold having a cavity with two immovable mutually opposed surfaces and with a rib projecting into the cavity from one surface of the opposed surfaces and a push bar slidably mounted in a channel and mutually opposed from the rib and projecting into the cavity from the other surface of the opposed surfaces, injecting liquid plastic into the mold to only partially fill the cavity therein, moving the push bar within the channel through a space extending at least one-half the distance across the cavity in the direction of the one surface and the projecting rib, said moving forcing the liquid plastic to flow in the opposite direction toward the other surface and to completely fill the remaining portion of the cavity surrounding the channel, said moving thereby forming mutually opposed and aligned grooves in the plastic, and sealing the push bar relative to the channel to exclude the flow of liquid plastic behind the push bar and into the space through which the push bar travels during said moving.

In one mode of practicing the above embodiment, said moving further includes forming a portion of reduced diameter in the plastic defined by the mutually opposed and aligned grooves formed therein, the reduced diameter portion having opposed and continuous arcuate surfaces. The injecting of plastic is simultaneous at two different locations on the mold and the ratio of the widths of the opposed and aligned grooves formed in the plastic during said moving by the push bar and the rib, respectively, is at least 3 to 1.

It is an object of the present invention to provide a new and improved method of forming with an injection mold a plastic device having a living hinge.

Related objects and advantages of the present invention will be apparent from the following description.

DESCRIPTION OF THE PREFERRED EMBODIMENTS

Figure 1:
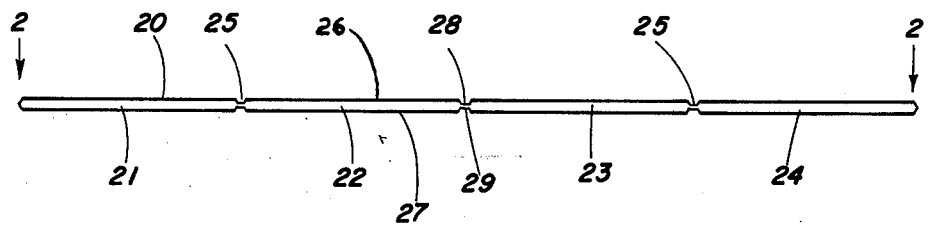
FIG. 1 is an edge view of a plastic strip produced in accordance with the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
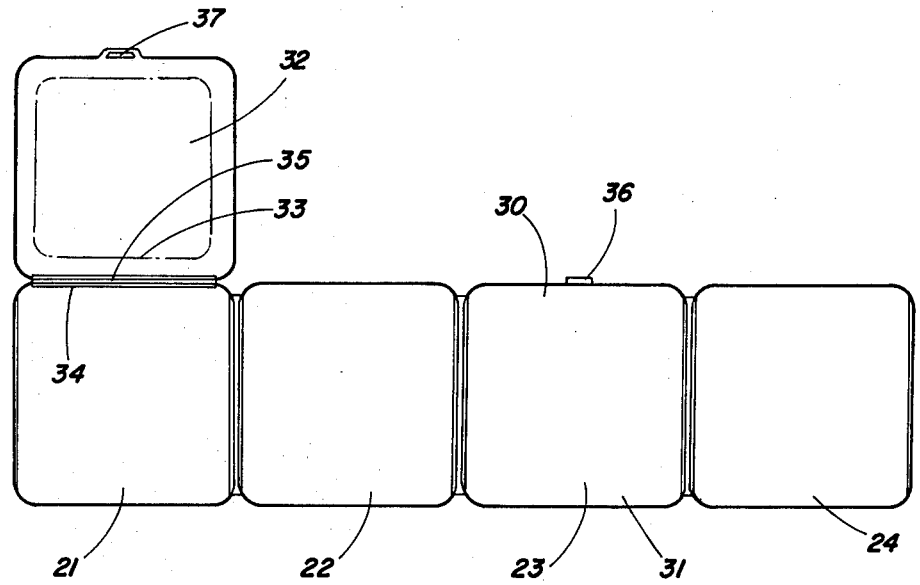
FIG. 2 is a plan view looking in the direction of arrows 2—2 of FIG. 1.

Referring now more particularly to FIG. 1, there is shown a strip of plastic material 20 having four panels 21 through 24 integrally connected together by living hinges 25. Each panel 21 through 24 has a pair of surfaces 26 and 27. Each hinge 25 has a groove 28 extending through surface 26 and a groove 29 extending through surface 27 providing a reduced thickness of the panel allowing the panels to be hinged. Each living hinge 25 extends from the top edge portion 30 (FIG. 2) to the bottom edge portion 31 of each panel.

Figures 3, 4:
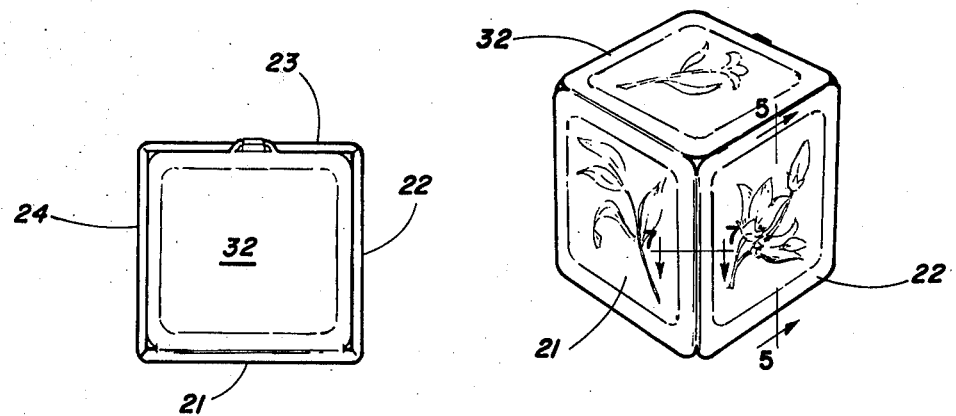
FIG. 3 is a top view of the box shown in FIG. 4.
FIG. 4 is a decorative box produced from the strip of FIG. 2.

The main body of the strip has an initial substantially flat configuration with the panels being integrally joined together by the plurality of living hinges. A fifth panel 32 has an edge portion 33 integrally connected to edge portion 34 of panel 21 by a living hinge 35 identical to living hinges 25 with the exception that living hinge 35 is arranged 90° with respect to living hinges 25. The four panels 21 through 24 may be folded so as to form a four-sided enclosure as shown in FIG. 3. The four-sided enclosure has opposite open ends, one of which may be closed by pivoting the fifth panel 32 downwardly adjacent the top edge portions of panels 21 through 24. A projection 36 forms a latch pin at the top edge of panel 23 whereas an aperture 37 is formed in a tab provided on an edge of panel 32 opposite living hinge 35. Thus, panel 32 may be swung downwardly so as to position projection 36 into aperture 37 thereby releasably locking panel 32 to panel 23, and thereby closing one of the open ends of the enclosure formed by the panels 21 through 24.

Figure 7:
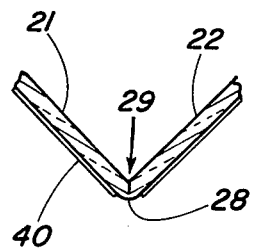
FIG. 7 is a fragmentary cross-sectional view taken along the line 7—7 of FIG. 4 and viewed in the direction of the arrows.

Hinges 25 and 35 are concealed once the flat strip is folded into its final configuration. For example, groove 28 provided in exterior surface 26 (FIG. 7) of panels 21 and 22 assumes a convex configuration when panel 21 is folded at a right angle relative to panels 22 whereas groove 29 assumes the configuration of a slit, which is positioned inwardly of the hinged panels.

Figure 5:
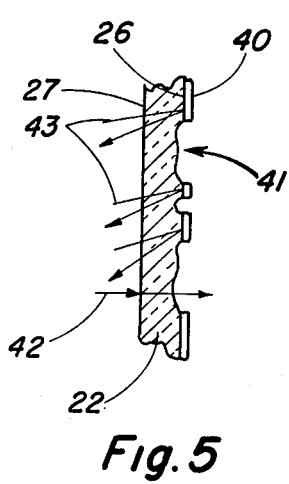
FIG. 5 is a fragmentary cross-sectional view taken along the lines 5—5 of FIG. 4 and viewed in the direction of the arrows.

In the embodiment shown in FIGS. 4 and 5, a decorative leaf 40 is attached to portions of the exterior surface 26 of the panels. Each panel is produced from a translucent material. Particularly excellent results have been obtained by producing each panel from a thermoplastic polycarbonate condensation product of bisphenol-14 and phosgene sold under the registered trademark of "Lexan" by the General Electric Company. This material allows light to shine through the panels. For example, panel 22 is provided with a decorative indentation 41 with leaf 40 covering all of the exterior surface 26 which is not indented by pattern 41. Thus, light from the interior of the box provided from a source such as a light bulb, will shine through the indentation 41 in the direction of arrow 42 thereby illuminating the indentation whereas remaining light rays shown by arrows 43 will be reflected off the interior surface of decorative leaf 40. Such a box-configured plastic device may be installed onto a conventional Christmas tree light bulb so as to illuminate the various patterns indented on the five panels of the box configuration as shown in FIG. 4.

Figure 6:
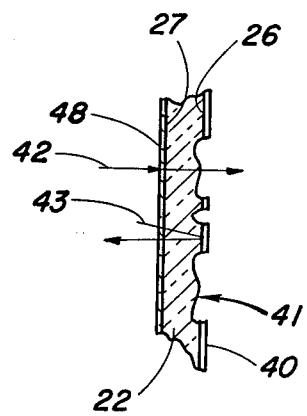
FIG. 6 is the same view as FIG. 5 only showing an alternate embodiment of the side wall of the box of FIG. 4.

Another embodiment of panel 22 is shown in FIG. 6 and is identical to the panel shown in FIG. 5 with the exception that an additional thin decorative leaf 48, which allows light to pass therethrough, is affixed to the interior surface 27 of panel 22 which also includes a relatively thick leaf 40 affixed to the exterior surface 26 of panel 22 in all areas except for the area of indented pattern 41. Thus, a light positioned within the box shown in FIG. 4 provided with the additional leaf shown in FIG. 6 will allow a particular color of light to shine through surface 27 in the direction of arrows 42 and through the indented pattern 41. For example, leaf 48 may be of a color such as green whereas leaf 40 may be of a silver color. Thus, indented pattern 41 will be illuminated by green light and surrounded by the silver leaf 40.

Figure 8:
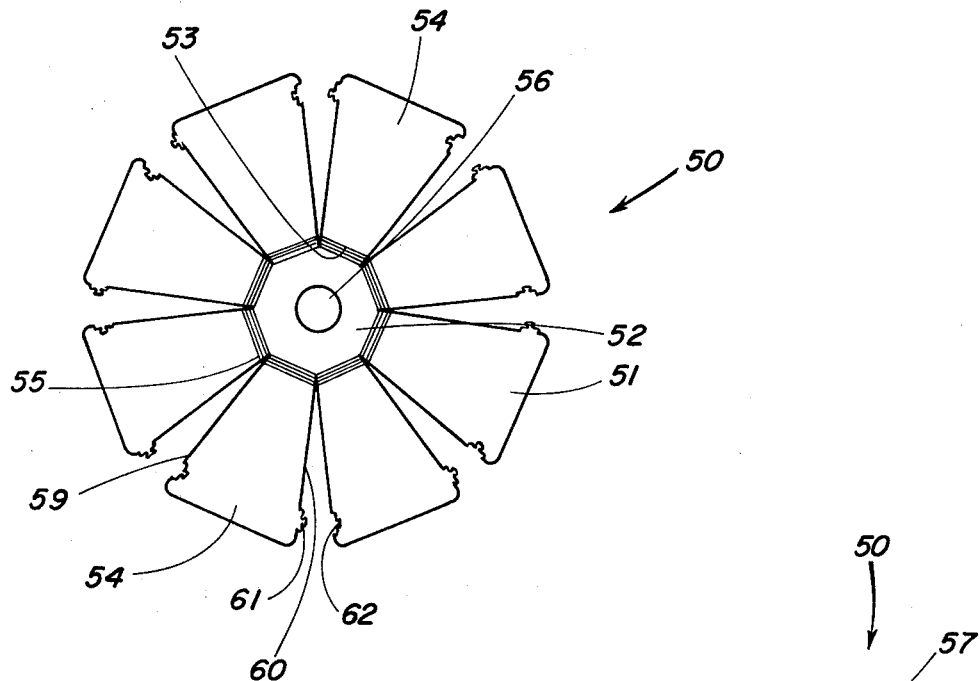
FIG. 8 is a plan view of a plastic device produced in accordance with the present invention and being configured in the form of a lamp shade.
Figure 9:
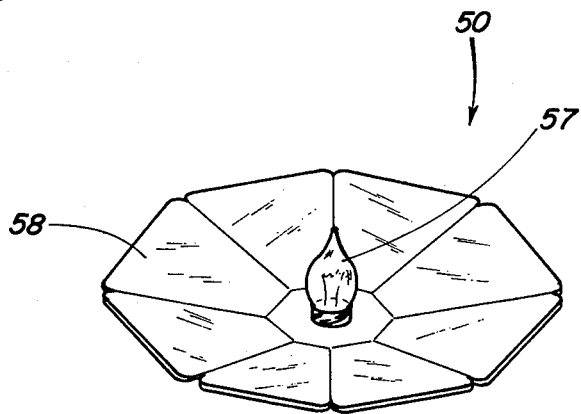
FIG. 9 is a perspective view of the final configured lamp shade of FIG. 8.

Another embodiment of a plastic device produced from a relatively flat strip is shown in FIGS. 8 and 9. The device shown in FIGS. 8 and 9 is configured as a shade 50 having a main body 51 produced by the previously-described material and techniques for producing a box configuration shown in FIG. 4. Shade 50 includes a center panel 52 with a circumferentially extending edge portion 53 and a plurality of outer panels 54 each including an end portion 55 connected to the edge portion 53 of center panel 52 by living hinges identical to those described and shown in FIG. 1. An aperture 56 is provided in center panel 52 for receiving a light bulb 57. Surface 58 of each panel 54 is provided with a decorative leaf thereby reflecting the light from bulb 57. Each panel 54 has a truncated triangular configuration with diverging longitudinal edges 59 and 60 extending outwardly from center panel 52. Means are provided on the outer panels 54 so as to lock the outer panels together providing a shade and reflector for light 57. For example, a projection 61 may be provided on edge 60 whereas a complementary cut-out portion 62 is provided in the adjacent edge of the adjacent panel so as to lockingly receive projection 61 thereby securing the panels together. Likewise, the longitudinally extending edges 59 and 60 of each panel 54 may be welded to the adjacent edge of the adjacent panel.

The decorative foil applied to the surfaces of the individual panels may be metallic foil of a variety of colors with the foil being secured to the panels by a hot roller stamp. Such decorative foil is commercially available along with the stamp for securing the foil to the plastic panels.

Figure 10:
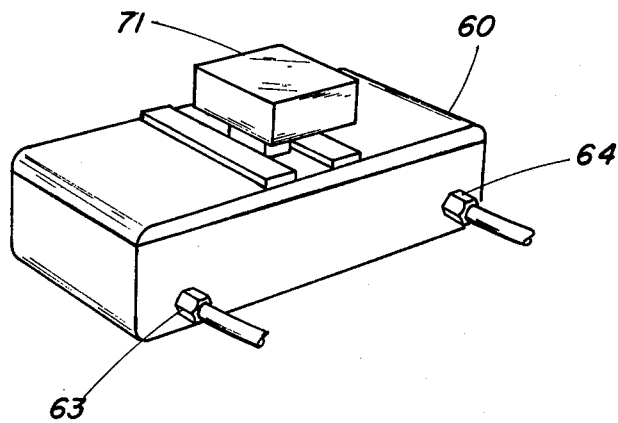
FIG. 10 is a perspective fragmentary view of an injection mold for practicing the invention disclosed herein.
Figure 11:
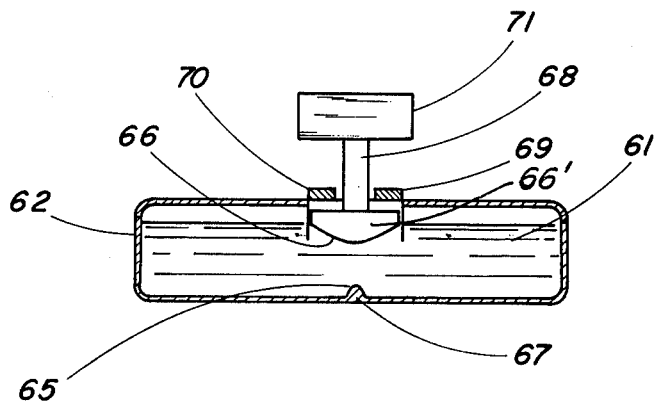
FIG. 11 is a cross-sectional view of the injection mold of FIG. 10 showing the cavity of the mold partially filled with liquid plastic.
Figure 12:
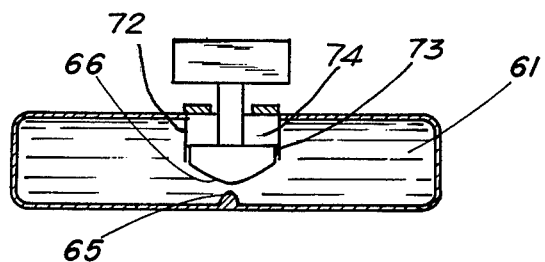
FIG. 12 is the same view as FIG. 11 only showing the mold filled with liquid plastic and with the press bar in the downward position.

One embodiment of the injection mold for producing the previously-described plastic devices is shown in FIGS. 10 through 12. Injection mold 60 includes a cavity 61 completely enclosed by exterior wall 62. At least two inlet means 63 and 64 are provided to allow injection of liquid plastic into cavity 61. The method of forming, with an injection mold, a plastic piece having a living hinge includes the step of injecting liquid plastic into cavity 61 of mold 60 of an amount to only partially fill the mold. Mold 60 is provided with a pair of opposed interior surfaces 65 and 66 with surface 66 being movable toward surface 65 so as to form the living hinge in the plastic piece produced with injection mold 60. Surface 65 is provided on an elongated projection 67 fixedly mounted to the mold and extending less than one-quarter of the distance across the cavity 61. Surface 66 is provided on a second elongated projection 66' which is positioned opposite projection 67 and is mounted to a movable push bar 68 slidably received and held by bearing plates 69 and 70 fixedly secured to mold 60. Push bar 68 extends into control means 71 which is mounted to the mold being operable to move projection 66' surface 66 toward surface 65 subsequent to the liquid plastic being injected into the cavity thereby forming a portion of reduced thickness in the plastic piece, or in other words, forming grooves 28 and 29 of living hinge 25 (FIG. 1). Each surface 65 and 66 is of a continuous arcuate configuration. Control means may be of a conventional design cylinder motor arrangement such as a pneumatic cylinder piston arrangement. Projection 66' is also positioned in channel 74 between a pair of rigid, elongated guide brackets 72 and 73 which extend into cavity 61 and guide projection 66' as it is reciprocated about three-quarters of the distance across cavity 61 by push bar 68, as shown in FIG. 12. The brackets also prevent the displaced liquid plastic from flowing behind projection 66' and into channel 74 thereby helping to form the living hinge 25.

After the liquid plastic is injected into the mold so as to only partially fill the mold, surface 66 is moved toward surface 65 so as to simultaneously form a living hinge in the molded part and with projection 66' and brackets 72 and 73 occupying a volume within the mold equal to the volume of the mold not filled initially by the liquid plastic. Thus, additional liquid plastic is not injected into the mold since surface 66 moves into the cavity a sufficient distance to force the liquid plastic to completely fill the remaining portion of the cavity. The liquid plastic is injected simultaneously through inlets 63 and 64 with push bar 68 being located between inlets 63 and 64. The top wall or front wall of the mold is then removed to allow removal of the solid plastic from the mold. A single inlet may be used in lieu of two inlets 63 and 64.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A method of forming with an injection mold a plastic piece with a living hinge, comprising the steps of:
    providing a mold having a cavity with two immovable mutually opposed surfaces and with a rib projecting into the cavity from one surface of the opposed surfaces and a push bar slidably mounted in a channel and mutually opposed from the rib, the push bar projecting into the cavity from the other surface of the opposed surfaces;
    injecting liquid plastic into the mold to only partially fill the cavity therein;
    moving the push bar within the channel through a space extending at least one-half the distance across the cavity in the direction of the one surface and the projecting rib, said moving forcing the liquid plastic to flow opposite the direction of the push bar toward the other surface and to completely fill the remaining portion of the cavity surrounding the channel, said moving thereby forming mutually opposed and aligned grooves in the plastic; and
    sealing the push bar relative to the channel to exclude the flow of liquid plastic behind the push bar and into the space through which the push bar travels during said moving.

2. The method in claim 1 in which said moving further includes forming a portion of reduced diameter in the plastic defined by the mutually opposed and aligned grooves formed therein, said forming being of a reduced diameter portion having opposed and continuous arcuate surfaces thereon.

3. The method in claim 2 in which the ratio of the widths of the opposed and aligned grooves formed in the plastic during said moving by the push bar and the rib, respectively, is at least 3 to 1.

4. The method in claim 3 in which said injecting of liquid plastic is simultaneous at two different locations on the mold with the rib and the push bar positioned between the two locations of said simultaneous injecting.

5. The method in claim 4 in which said sealing is by means of a pair of rigid, elongated guide brackets which extend into the cavity and define the channel for the push bar, the guide brackets being fixed to the other surface in the mold to exclude the liquid plastic from flowing behind the push bar and into the space within the channel through which the push bar travels during said moving.

* * * * *